(12) United States Patent
Imanishi

(10) Patent No.: US 7,652,451 B2
(45) Date of Patent: Jan. 26, 2010

(54) CHARGING CONTROL CIRCUIT

(75) Inventor: Masato Imanishi, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 298 days.

(21) Appl. No.: 11/863,300

(22) Filed: Sep. 28, 2007

(65) Prior Publication Data

US 2008/0284382 A1  Nov. 20, 2008

(30) Foreign Application Priority Data

May 15, 2007  (JP) ............................. 2007-129412

(51) Int. Cl.
*H02J 7/00* (2006.01)
*H02J 7/04* (2006.01)

(52) U.S. Cl. ...................... 320/106; 320/162

(58) Field of Classification Search ................. 320/106, 320/162

See application file for complete search history.

(56) References Cited

U.S. PATENT DOCUMENTS 5,945,805 A * 8/1999 Takei et al. ................. 320/124

FOREIGN PATENT DOCUMENTS

| JP | 2001054243 | 2/2001 |
|----|------------|--------|
| JP | 2002010508 | 1/2002 |

* cited by examiner

*Primary Examiner*—Edward Tso
*Assistant Examiner*—Richard V Muralidar
(74) *Attorney, Agent, or Firm*—Thomas J. Strouse; Peyton C. Watkins

(57) ABSTRACT

A primary cell and a secondary cell are distinguished from each other. A microcomputer of a digital camera determines a first cell (a primary cell) and a second cell (a secondary cell) as a built-in cell. When a dedicated charging device is connected to a digital camera, a microcomputer activates transistor switches to thus detect a terminal voltage of the second cell. When the terminal voltage shows a finite value, the second cell is determined to be incorporated. When the terminal voltage shows a value of essentially zero, the transistor switch is activated to thus apply a predetermined voltage. When a voltage drop attributable to a resistor has arisen, the second cell is determined to be overcharged. When both a terminal of the second cell and a terminal of the first cell show finite values, a short circuit is determined to have arisen.

1 Claim, 5 Drawing Sheets

CHARGING CONTROL CIRCUIT

CROSS REFERENCE TO RELATED APPLICATIONS

This application claims priority to Japanese Patent Application No. 2007-129412 filed on May 15, 2007, which is incorporated herein by reference in its entirety.

FIELD OF THE INVENTION

The present invention relates to a charging control circuit and, more particularly, to a circuit for controlling whether to perform charging by means of distinguishing between a primary cell and a secondary cell.

BACKGROUND OF THE INVENTION

A technique for determining the type of a cell and performing charging operation according to the type of the cell is known. For instance, JP Publication No. 2002-10508 describes detection of a connection of an external cell through use of a mechanical mechanism and electrical detection performed by way of a terminal for use in detecting a connection, wherein a resistance value or an impedance value of a cell is read beforehand and the type of an external cell connected to equipment is determined by means of taking the value as an ID signal. Further, the patent publication also describes exchange of an electrical pulse signal between a detection section and a cell pack by use of a microprocessor, or the like, to thus determine the type of a cell connected to the equipment.

JP Publication No. 2001-54243 describes computation of the amount of change between the voltage of a cell terminal acquired when a voltage is applied to the cell terminal from the outside and the voltage of the cell terminal acquired when no voltage is applied to the cell terminal from the outside, thereby determining, from the amount of voltage change, whether the cell is a primary cell or a secondary cell.

However, if the type of a cell can be determined simpler without use of the mechanical mechanism, such a determination is desirable. When the type of a cell is determined by use of a terminal voltage, the capability of determining an overdischarge of the secondary cell as well as the capability of distinguishing between a primary cell and a secondary cell are preferable. Specifically, in addition to the case where the terminal voltage of the secondary cell is substantially zero and where the secondary cell is not present, there is a conceivable case where the secondary cell is present but simply remains overdischarged. In reality, if the secondary cell is determined not to be present despite the secondary cell remaining overdischarged, there may arise a case where originally-required recharging of the secondary cell is not performed. Further, when the primary cell and the secondary cell are of the same type but differ from each other in terms of the position of a terminal, the primary cell and the secondary cell are housed in a single housing. Therefore, detection of a difference between the positions of the terminals in principle enables distinction between the primary cell and the secondary cell. However, when the difference between the positions of the terminals cannot be detected for reasons of physical damage, and a like case, it may be the case where the battery cells cannot be distinguished from each other.

SUMMARY OF THE INVENTION

The present invention is intended to provide a circuit capable of distinguishing between a primary cell and a secondary cell and controlling charging operation by reliably detecting occurrence of an overdischarge of the secondary cell.

The present invention provides a charging control circuit for charging, by means of an external charging device, a secondary cell in equipment capable of housing a primary cell and a secondary cell as built-in cells, the circuit comprising:

a first terminal voltage detection circuit which detects a terminal voltage of the secondary cell of the built-in cells and a terminal voltage of the primary cell of the same which detects the built-in cell as a secondary cell even when a predetermined terminal voltage is detected from only the terminal voltage of the secondary cell, and which detects a short circuit when the predetermined terminal voltage has been detected in the terminal voltage of the secondary cell and the terminal voltage of the primary cell;

a second terminal voltage detection circuit for detecting that the built-in cell is an overdischarged secondary cell when the first terminal voltage detection circuit has not detected the predetermined terminal voltage and when a voltage drop has been detected by application of a predetermined voltage to the terminal of the secondary cell of the built-in cell; and a control circuit which allows the external charging device to charge the built-in cell when the first terminal voltage detection circuit and the second terminal voltage detection circuit have detected that the built-in cell is a secondary cell and when the short circuit is not detected.

In the present invention, a terminal voltage of the secondary cell and a terminal voltage of the primary cell are detected. When only the terminal voltage of the secondary cell has been detected, it is detected that a built-in cell is the secondary cell. When both the terminal voltage of the secondary cell and the terminal voltage of the primary cell show a predetermined terminal voltage, a short circuit between the terminals is detected. A primary terminal voltage detection circuit and a secondary terminal voltage detection circuit detect that the built-in cell is the secondary cell. Further, when a short circuit is not detected, an external charging device is allowed to charge the built-in cell, whereby determination and charging of the secondary cell are controlled. Since, in the present invention, charging operation is not performed when a short circuit has been detected, erroneous charging is prevented.

According to the present invention, determination of the primary cell and the secondary cell and detection of an overcharge of the secondary cell are detected reliably, to thus enable control of charging operation.

The invention will be more clearly comprehended by reference to the embodiments provided below. However, the scope of the invention is not limited to the embodiments.

BRIEF DESCRIPTION OF THE DRAWINGS

Preferred embodiments of the present invention will be described in detail by reference to the following drawings, wherein.

DETAILED DESCRIPTION OF THE INVENTION

An embodiment of the present invention will be described hereunder by reference to the drawings.

Figure 1:
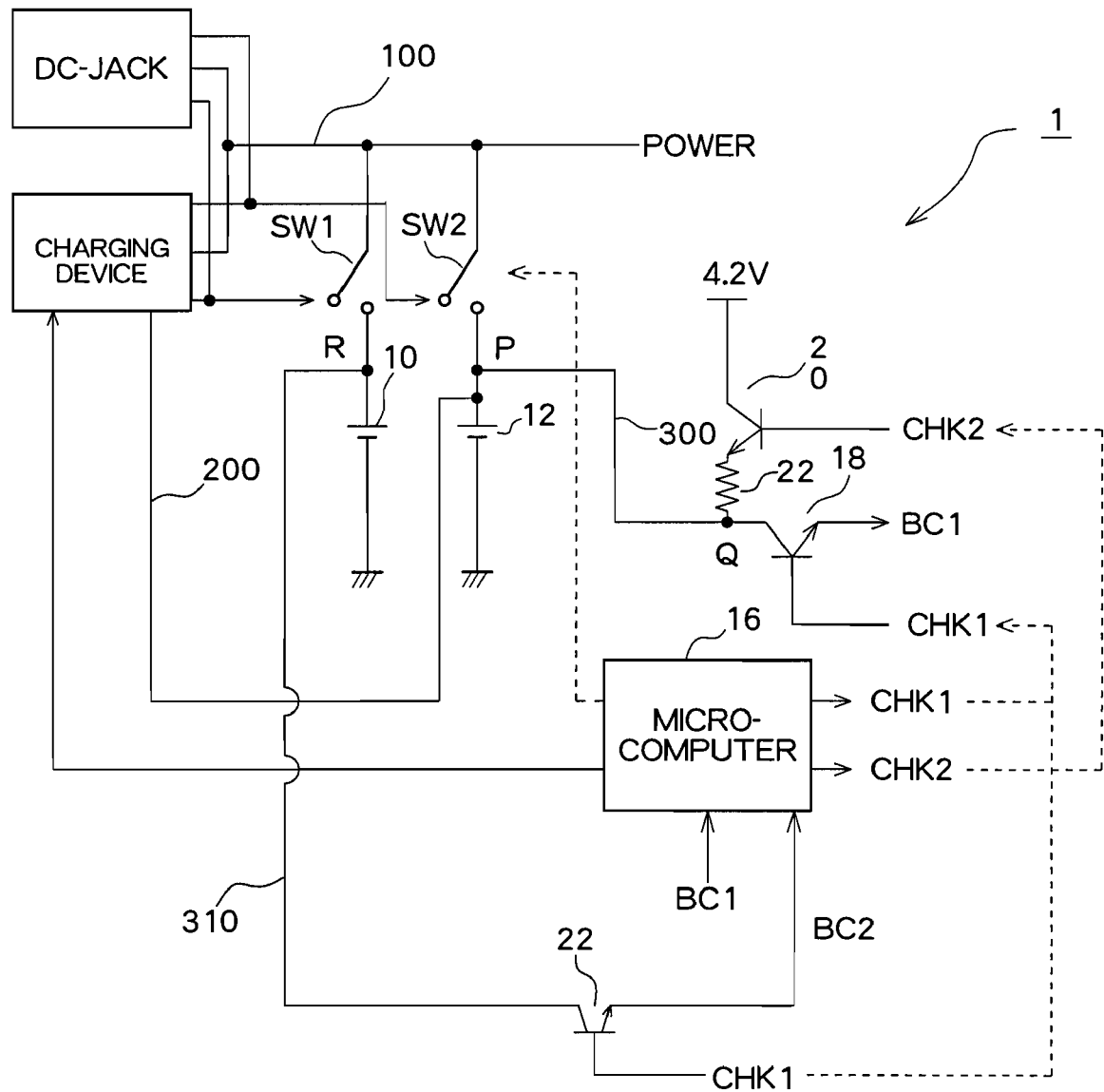
FIG. 1 is a circuit diagram of a charging control circuit according to an embodiment of the present invention.
Figure 3A:
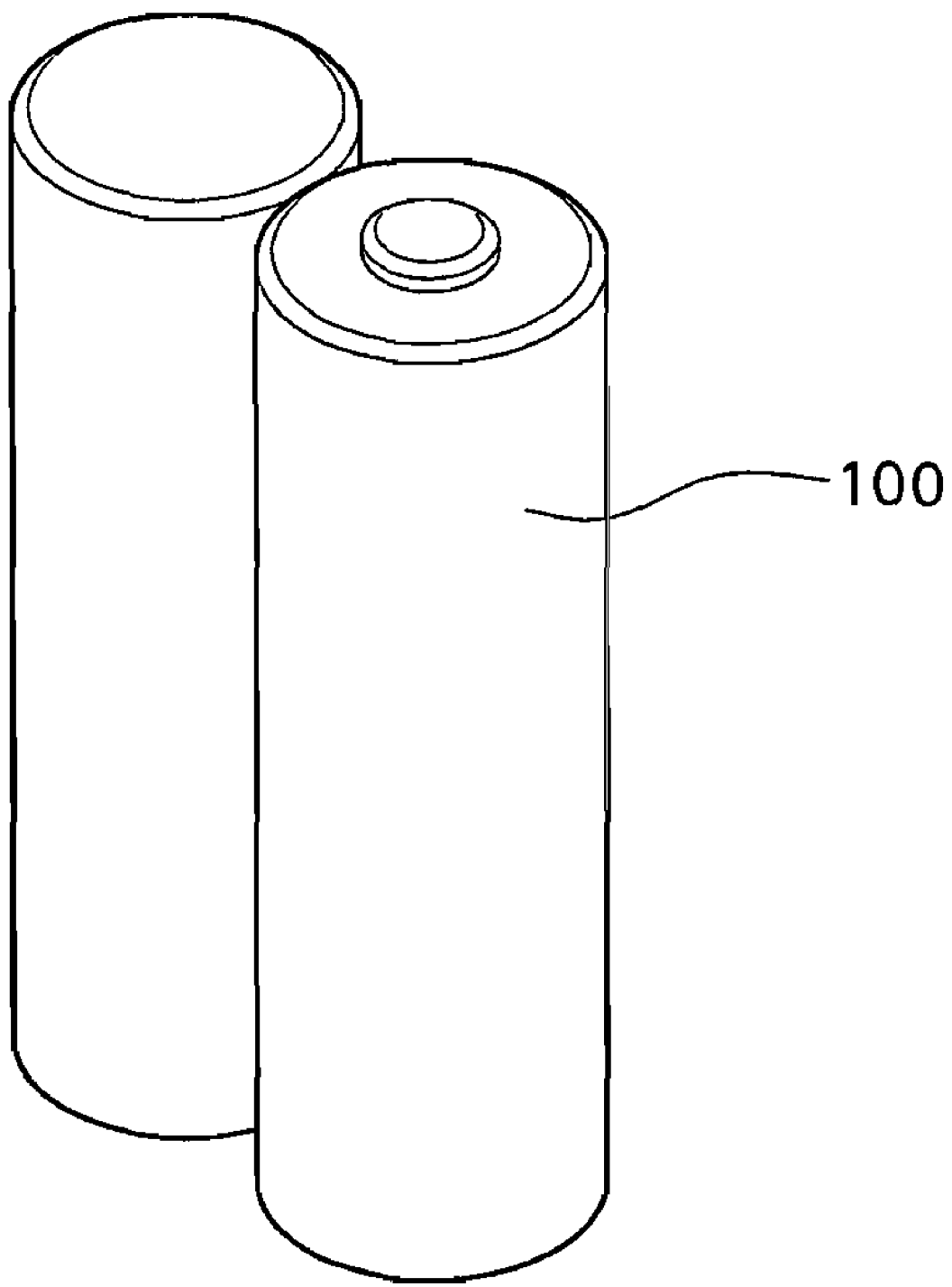
FIG. 3A is a perspective view of a primary cell (an AA cell)
Figure 3B:
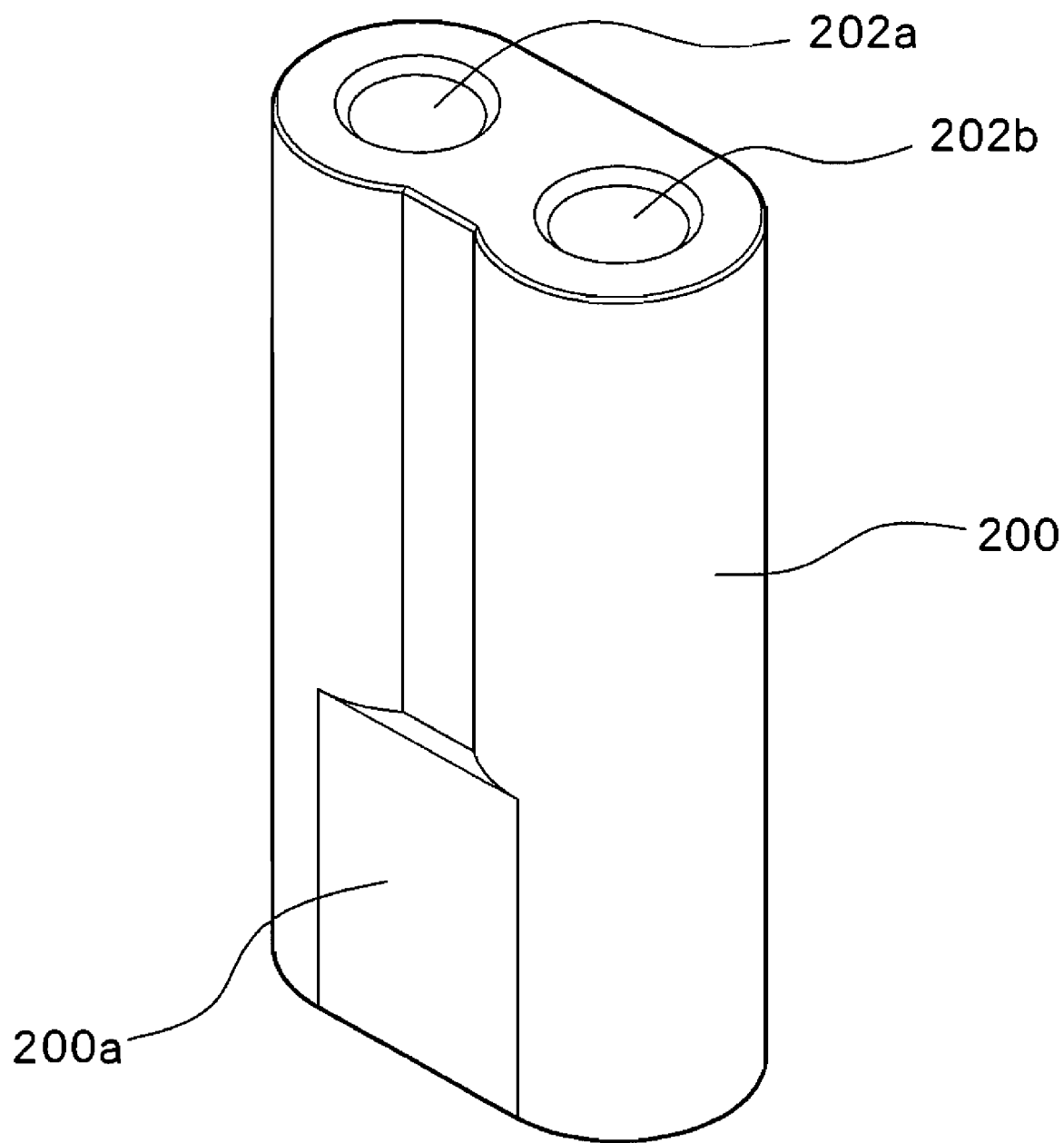
FIG. 3B is a perspective view of a CR-V3 cell.
Figure 3C:
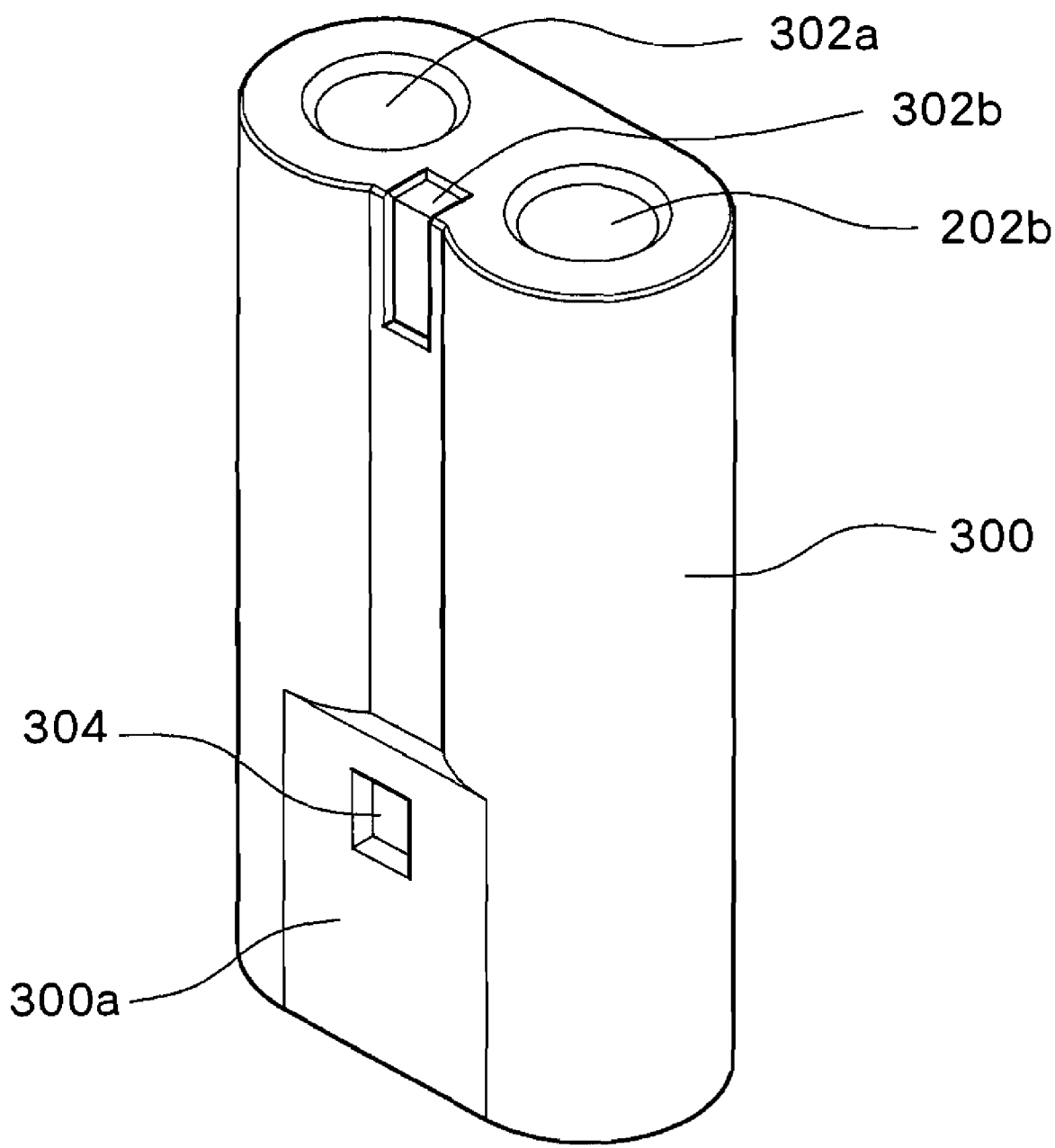
FIG. 3C is a perspective view of a dedicated secondary cell.

FIG. 1 shows a configuration of a charging control circuit of the embodiment. A charging control circuit 1 is formed from, e.g., a digital camera. The digital camera can use, as built-in cells, a primary cell and a secondary cell. An alkaline dry cell, a lithium cell (of AA or CR-V3 type) is available as an unrechargeable primary cell. Meanwhile, a lithium ion cell and a nickel hydrogen cell (of AA type or a rectangular cell) are available as a repeatedly-rechargeable secondary cell. In relation to a digital camera using a CR-V3 cell (hereinafter called as a "first cell") as a primary cell and a unique lithium ion cell (hereinafter called a "second cell"), as a secondary cell, which is of the same type as that of the CR-V3 cell and is designed so as to become different from the same in terms of the position of an output terminal, the present embodiment provides a circuit configuration for distinguishing between the first cell and the second cell and distinguishing between an inserted state of the second cell and an overdischarged state of the same. FIG. 3A shows an appearance of a primary cell 100 of AA type; FIG. 3B shows an appearance of a CR-V3 cell 200; and FIG. 3C shows an appearance of a dedicated lithium ion cell 300. The CR-V3 cell 200 has terminals 202a and 202b, and a flat section 200a is formed in the side of the CR-V3 cell. The terminal 202a serves as a negative terminal, and the terminal 202b serves as a positive terminal. The dedicated secondary cell 300 has terminals 302a and 302b at positions differing from those where the terminals of the CR-V3 cell 200 are located, and a flat section 300a is formed in the side of the secondary cell 300. The terminal 302a serves as a negative terminal, and the terminal 302b serves as a positive terminal. A recess 304 is additionally formed in the flat section 300a of the dedicated secondary cell 300. This recess is intended for enabling mechanical distinction between the CR-V3 cell 200 and the dedicated secondary cell 300. In the present embodiment, the recess 304 is not necessary.

As shown in FIG. 1, in addition to being driven by built-in cells, the digital camera is driven by a power supply from an external power source while being connected to a DC-Jack (DC jack) or a dedicated charging device. The DC-Jack or the dedicated charging device is connected to a power line 100, and power is supplied to respective sections of the digital camera. A first cell 10 and a second cell 12 are connected to the power line 100 by way of respective switches SW1 and SW2. The DC-Jack and the dedicated charging device are separately connected to the switches SW1 and SW2, respectively. Either of the DC-Jack and the dedicated charging device is connected to the digital camera, whereby both the switches SW1 and SW2 are deactivated by means of a transistor circuit. When a connection to the DC-Jack or the dedicated charging device has been detected in response to a command from a microcomputer 16, the switches SW1 and SW2 may be controlled so as to become turned off. The first cell 10 and the second cell 12 are alternately housed in the digital camera, and the first cell 10 and the second cell 12 have terminals at different positions as shown in FIGS. 3A to 3C. The switch SW1 is connected to the terminal of the first cell 10, and the switch SW2 is connected to the terminal of the second cell 12. When the digital camera is connected to the DC-Jack or the dedicated charging device, the switches SW1 and SW2 are deactivated. Hence, only power from the external power source is fed to the power line 100, and no power is supplied from the built-in cells.

When the digital camera is connected to the dedicated charging device, a charging line 200 connecting a charging circuit of the dedicated charging device to a charging circuit of the digital camera becomes active, and the second cell 12 is recharged by the power supply from the dedicated charging device. Specifically, when the microcomputer 16 detects a connection of the digital camera to the dedicated charging device and when incorporation of the second cell 12 is detected rather than incorporation of the first cell 10, a second cell detection signal is transmitted to a microcomputer of the dedicated charging device. The microcomputer of the dedicated charging device receives a detection signal from the microcomputer 16 of the digital camera and controls the switches provided in the dedicated charging device so as to be turned on, thereby activating a recharge line 200. When the built-in cell corresponds to the first cell 10, the switches SW in the dedicated charging device remain turned off. When the digital camera is disconnected from the DC-Jack or the dedicated charging device, the switches SW1 and SW2 are turned on, thereby bringing the built-in cells into connection with the power line 100. The digital camera receives a power supply from the built-in cells, to thus operate.

Although one (the positive terminal) of the terminals of the second cell 12 is connected to the power line 100 by way of the switch SW2 as mentioned above, a determination signal line 300 is connected to a point P located between the switch SW2 and the positive terminal of the second cell 12. The determination signal line 300 has transistor switches 18 and 20. Activation and deactivation of the transistor switch 18 are controlled by a control signal CHK1 from the microcomputer 16, and activation and deactivation of the transistor switch 20 are controlled by a control signal CHK2 from the microcomputer 16. A transistor switch 20 is connected to a point Q of the determination signal line 300; namely, a point located between the point P and the input terminal of the transistor switch 18, by way of a resistor 22. A predetermined voltage (e.g., 4.2 V) is applied to the remaining terminal of the transistor switch 20. A voltage signal BC1 output to the output terminal of the transistor switch 18 is supplied as a result of determination to the microcomputer 16.

The microcomputer 16 detects a terminal voltage of the second cell 12 by means of activating the transistor switch 18. When the voltage signal BC1 shows a finite value, the second cell 12 can be detected to be incorporated rather than the first cell 10 being detected to be incorporated. Meanwhile, when the voltage signal BC1 assumes a value of substantially zero (does not show any finite value), no battery can be assumed to be incorporated or the first cell 10 can be estimated to be incorporated rather than the second cell 12 being estimated to be incorporated. Likewise, there is a case where the voltage signal BC1 essentially comes to zero even when the overdischarged second cell 12 is incorporated instead of the first cell 10, these cases must be distinguished from each other. In such a case, the microcomputer 16 activates the transistor 20 in addition to activating the transistor switch 18, thereby applying a predetermined voltage to the terminal of the second cell 12. When no battery is incorporated or the first cell 10 is incorporated instead of the second cell 12, the voltage signal BC1 essentially shows a predetermined voltage (4.2 V). Meanwhile, when the overdischarged second cell 12 is incorporated, application of the predetermined voltage results in a voltage drop induced by the resistor 22. Hence, the voltage signal BC1 becomes essentially lower than a predetermined voltage 4.2 V. Consequently, the microcomputer 16 compares a predetermined threshold value with the voltage signal BC1 achieved when the transistor switches 18 and 20 are activated, thereby enabling making of a determination as to whether the second cell 12 is not incorporated or the overdischarged second cell 12 is incorporated.

The first cell 10 and the second cell 12 are alternatively housed in the single housing of the digital camera. The second cell 12 has the terminals 302a and 302b, as shown in FIG. 3C, as well as having the terminal 202b. Since the terminals 302b and 202b are closely proximate to each other, it may be the case where a short circuit arises between the terminal 302b and the terminal 202b depending on the usage or handling of the digital camera by the user. In this case, in the circuit diagram shown in FIG. 1, there arises a circuit status where a short circuit occurs between the positive terminal (202b) of the first cell 10 and the positive terminal (302b) of the second cell 12, thereby rendering distinction between the first cell 10 and the second cell 12 impractical. Below is the reason for this. When the transistor switch 18 is activated and the voltage signal BC1 shows a finite value, the microcomputer 16 detects that the second cell 12 is incorporated instead of the first cell 10. However, in a case where the positive terminal of the first cell 10 and the positive terminal of the second cell 12 are short-circuited, the voltage signal BC1 shows a finite value even when the first cell 10 is incorporated. Hence, the microcomputer 16 erroneously determines that the second cell 12 is incorporated.

For these reasons, in the circuit diagram shown in FIG. 1, a determination signal line 310 is connected to a point R located between the switch SW1 and the positive terminal of the first cell 10. The determination signal line 310 has a transistor switch 22, and activation and deactivation of the transistor switch 22 are controlled, as is the transistor switch 18, by the control signal CHK1 from the microcomputer 16. The microcomputer 16 activates the transistor 22, as well as activating the transistor 18, and detects a voltage signal BC2 showing a terminal voltage of the first cell 10 along with the voltage signal BC1. When the voltage signal BC1 shows a finite value, the second cell 12 is not immediately determined to be incorporated. After the voltage signal BC2 has been ascertained to show a zero level, the second cell 12 is determined to be incorporated. When the voltage signal BC1 shows a finite value and the voltage signal BC2 also shows a finite value, the microcomputer 16 determines that the positive terminal of the first cell 10 and the positive terminal of the second cell 12 are short-circuited. The reason for this is that, since the first cell 10 and the second cell 12 are alternatively incorporated, both the voltage signal BC1 and the voltage signal BC2 cannot show finite values simultaneously if normal operation is achieved.

When the second cell 12 whose terminal is short-circuited is overdischarged, the voltage signal BC1 shows a value of zero and the voltage signal BC2 also shows a value of zero. Thus, the overdischarged state cannot be distinguished from an empty state. However, in this case, when the value of the voltage signal BC1 shows a finite value which is smaller than a predetermined voltage as a result of the transistor switch 20 being activated by the control signal CHK2 and when the voltage signal BC2 still shows a value of zero, it can be determined that the overdischarged second cell 12 is incorporated and that no short circuit exists. Meanwhile, when the voltage signals BC1 and BC2 have become lower than a predetermined voltage and assumed the same voltage value, a short circuit can be determined to have arisen.

Figure 2:
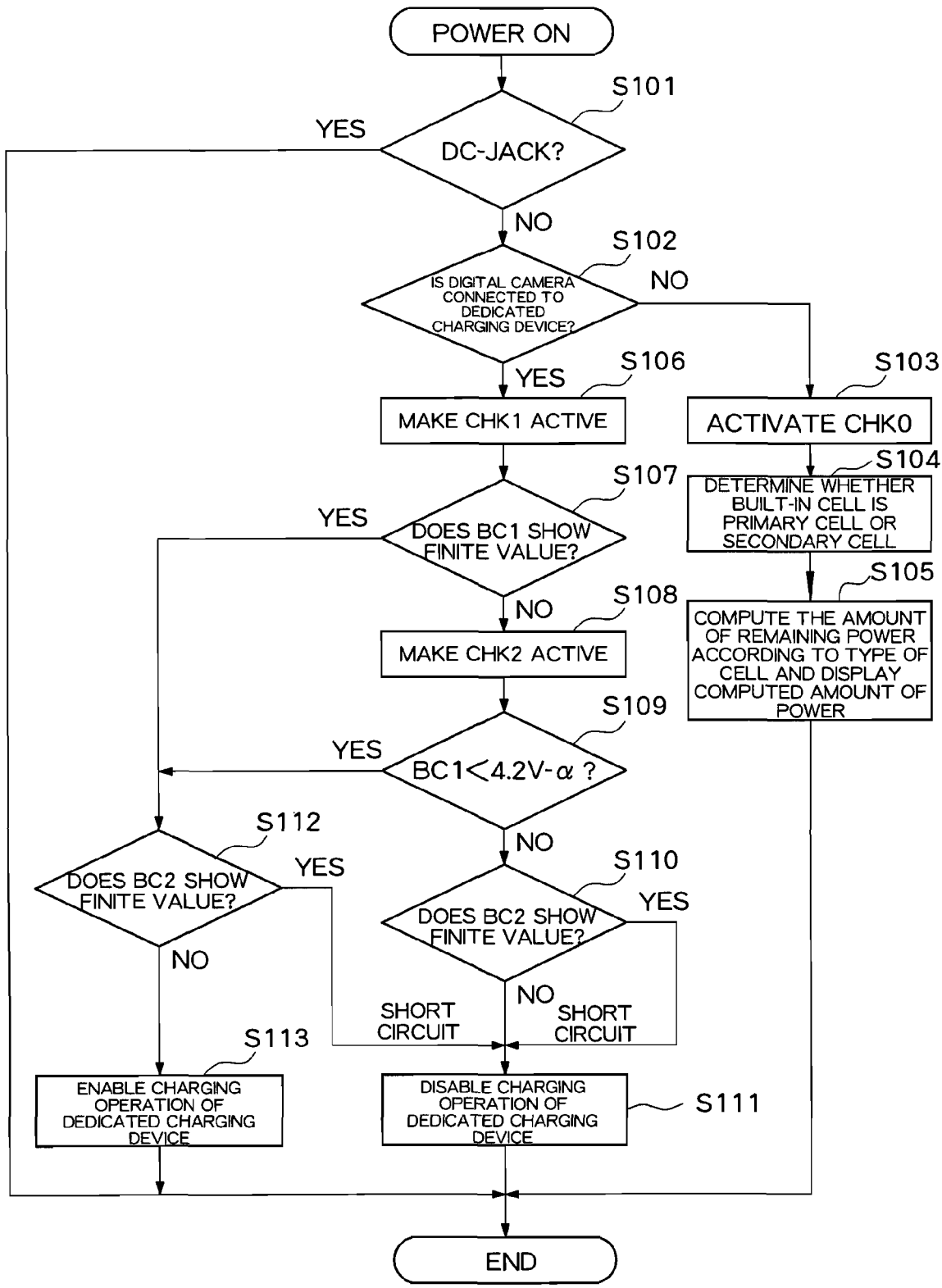
FIG. 2 is a flowchart of processing of the embodiment.

FIG. 2 shows a flowchart of processing of the present embodiment. First, the microcomputer 16 determines whether or not the digital camera is connected to the DC-Jack (DC jack) (S101). When the digital camera is not connected to the DC-Jack, an additional determination is made as to whether or not the digital camera is connected to a dedicated charging device (a dock) (S102). The power source of the DC-Jack and the power source of the dedicated charging device are connected to the microcomputer 16 by way of an unillustrated circuit, and the microcomputer 16 determines whether or not the digital camera is connected to the external power source and the type of the external power source, by use of the circuit. When neither the DC-Jack nor the dedicated charging device is connected to the digital camera, a determination is made as to whether or not a cell is incorporated. When a cell is incorporated, the voltage of the power line 100 is detected. When the voltage of the power line 100 is detected while the digital camera is not connected to the external power source, the microcomputer 16 makes a CHK0 signal active and deactivates the switch SW2 (S103), thereby determining whether the built-in cell is the first cell 10 or the second cell 12 (S104). Namely, when the voltage of the power line 100 is detected even when the switch SW2 remains deactivated, the built-in cell is determined to be the first cell. When the voltage is not detected, the built-in cell is determined to be the second cell 12. By means of such a determination, the amount of power remaining in the first cell and the amount of power remaining in the second cell, both of which differ from each other in terms of a voltage, can be detected in a distinguished manner, and an appropriate amount of remaining power can be displayed for the user (S105). Meanwhile, when either the DC-Jack or the dedicated charging device is connected to the digital camera, both the switches SW1 and SW2 become deactivated. When the DC-Jack is connected to the digital camera (YES in S101), recharging is not performed, and hence cell determination processing is not performed.

When the dedicated charging device is connected to the digital camera (YES in S102), processing proceeds to cell determination processing. Specifically, the microcomputer 16 makes the CHK1 signal activate (S106). Thus, the transistor switch 18 is activated, and the voltage signal BC1 is supplied to the microcomputer 16. The microcomputer 16 determines whether or not the voltage signal BC1 shows a finite value (S107). When the voltage signal BC1 does not show any finite value (NO in S107), the second cell 12 is determined not to be incorporated, or the second cell 12 is determined to be incorporated but exhibit an anomalously-low terminal voltage; namely, the second cell 12 is determined to be overdischarged. The case where the second cell 12 is not incorporated includes a case where the cell itself is not incorporated and a case where the first cell 10 is incorporated. Therefore, the CHK2 signal is subsequently made active (S108), to thus activate the transistor switch 20. Thus, a predetermined voltage is applied to the terminal of the second cell 12, thereby ascertaining whether or not the voltage signal BC1 is lower than a predetermined voltage 4.2 V−α. Here, reference symbol α designates a voltage drop induced by the resistor 22. When the voltage signal BC1 is smaller than the predetermined voltage 4.2 V−α, this means that the second cell 12 is incorporated and remains overdischarged. In contrast, when the voltage signal BC1 is not smaller than 4.2 V−α, the second cell 12 is determined not to be incorporated, and a determination is made as to whether or not the voltage signal BC2 shows a finite value (S110). When the voltage signal BC2 shows a finite value, this means that the first cell 10 is incorporated, and the terminal is determined to be short-circuited, so that charging operation of the dedicated charging device is not allowed (S111). When the voltage signal BC2 does not show any finite value; namely, when the voltage signal BC2 assumes a value of zero, the first cell 10 is not incorporated. Hence, charging operation of the dedicated charging device is not allowed in a like manner. Specifically, the second battery detection signal is not transmitted to the dedicated charging device, and the charging line 200 is disabled.

When the voltage signal BC1 shows a finite value (YES in S107), the second cell 12 is determined to be incorporated;

however, it may be the case where the terminal of the second cell 12 is short-circuited. Moreover, even when the voltage signal BC1 is smaller than 4.2 V−α, the second cell is incorporated. Hence, a determination is then made as to whether or not the voltage signal BC2 shows a finite value (S112). When both the voltage signals BC1 and BC2 show finite values, the terminal of the second cell 12 is assumed to be short-circuited, and the dedicated charging device is not allowed to recharge the second cell (S111). In this case, a warning of occurrence of a short circuit is provided to the user by means of illuminating an LED provided at a predetermined position on the digital camera or providing a display on a monitor screen. When the voltage signal BC1 shows a finite value but the voltage signal BC2 assumes a value of zero, no short circuit is determined to have arisen in the terminal of the second cell 12, and the terminal is determined to be normal. Thus, recharging operation of the dedicated charging device is allowed (S113).

In addition to enabling detection of a short circuit of the second cell 12, the present embodiment enables making of a reliable determination as to whether or not recharging is necessary even when the second cell 12 is short-circuited.

As mentioned above, the present embodiment enables easy distinction between the primary cell and the secondary cell and easy determination of overdischarge of the secondary cell, whereby the secondary cell can be recharged reliably. Moreover, even when a short circuit exists, a reliable determination can be made as to whether or not recharging operation is necessary.

PARTS LIST

1 charging control circuit
10 first cell
12 second cell
16 microcomputer
18 transistors
20 transistors
22 resistor
100 primary cell
100 power line
200 charging line
200 CR-V3 cell
200*a* flat section
202*a* negative terminal
202*b* positive terminal
300 lithium cell
300 determination signal line
300*a* flat section
302*a* negative terminal
302*b* positive terminal
304 recess
310 determination signal

What is claimed is:

1. A charging control circuit for charging, by means of an external charging device, a secondary cell in equipment capable of housing a primary cell and a secondary cell as built-in cells, the circuit comprising:

a first terminal voltage detection circuit which detects a terminal voltage of the secondary cell of the built-in cells and a terminal voltage of the primary cell of the same which detects the built-in cell as a secondary cell even when a predetermined terminal voltage is detected from only the terminal voltage of the secondary cell, and which detects a short circuit when the predetermined terminal voltage has been detected in the terminal voltage of the secondary cell and the terminal voltage of the primary cell;

a second terminal voltage detection circuit for detecting that the built-in cell is an overdischarged secondary cell when the first terminal voltage detection circuit has not detected the predetermined terminal voltage and when a voltage drop has been detected by application of a predetermined voltage to the terminal of the secondary cell of the built-in cell; and a control circuit which allows the external charging device to charge the built-in cell when the first terminal voltage detection circuit and the second terminal voltage detection circuit have detected that the built-in cell is a secondary cell and when the short circuit is not detected.

* * * * *